UNITED STATES PATENT OFFICE.

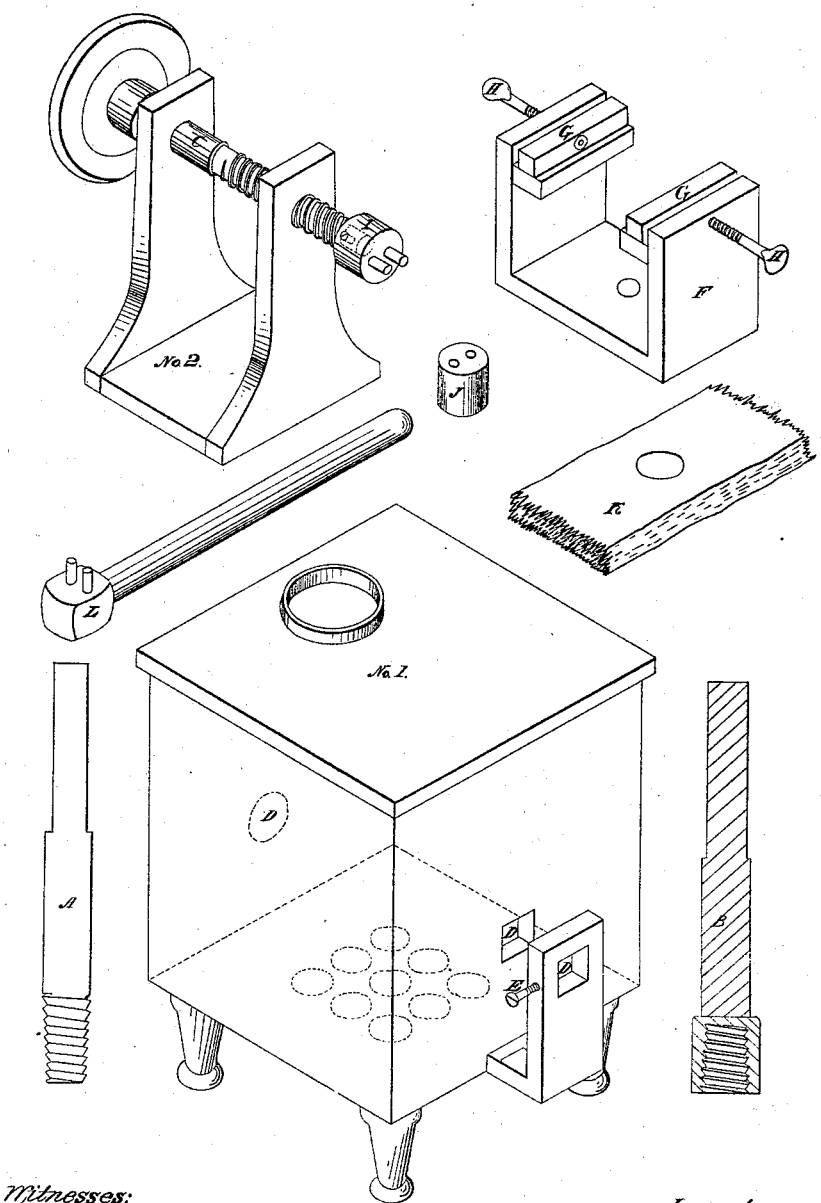

T. B. SMITH, OF NEW YORK, N. Y.

METHOD OF BURNING THE THREADS ON WOODEN SCREWS.

Specification of Letters Patent No. 22,985, dated February 15, 1859.

*To all whom it may concern:*

Be it known that I, T. BRIGGS SMITH, of the city and State of New York, have invented a new and Improved Mode of Making and Introducing Bungs into Casks or Any Wooden Vessel for Liquids; and I do hereby declare that the following is a full and exact description thereof, reference being had to the accompanying drawings and to the letters of reference marked thereon.

The nature of my invention consists in forming a screw by burning on the bung or stopple; also in burning a corresponding screw on the hole in the stave. The bung will be air-tight, in consequence of its smooth imperishable charred surface. A screw cut by any tool across the grain of the wood could not be made perfectly tight.

To enable others skilled in the art to make and use my invention, I will proceed to describe the construction and operation of the apparatus by which it may be carried into effect.

I construct a stove No. 1 for heating with ordinary fuel the burners A and B. No. 2 is a stand attached to which is a mandrel C, with a screw cut on the same corresponding with the screws on the burners A and B. The burners A and B pass through the apertures D and D in stove No. 1, there to be heated as required, by moveng them out or in to produce the proper degree of heat and fastened, when required, by the screw E. The burners A and B do not revolve, the necessary revolutions being effected by the mandrel or screw C attached to which is the apparatus F for holding the stave with the aid of the clamps G and G and the screws H and H.

I is an apparatus affixed to the mandrel C for holding the bung J while being burned by the revolving mandrel C. Either F or I can be attached to the mandrel C at will.

K is a section of a stave with a hole in it ready for burning.

L is a wrench for inserting and removing the bungs.

What I claim as my invention and desire to secure by Letters Patent is—

1. The application of a screw made on a bung and another screw made in the stave corresponding with that upon the bung both being formed by burning. This bung is to be used for all casks or vessels made of wood for liquids.

2. I also claim the forming a screw by burning on a bung or stopple to be used in any vessel, made of any material, whether wood, metal, glass, or other material.

T. BRIGGS SMITH.

Witnesses:
   T. C. H. SMITH,
   L. W. SMITH.